United States Patent
Hershenson et al.

(10) Patent No.: US 9,753,702 B2
(45) Date of Patent: Sep. 5, 2017

(54) SYSTEMS AND METHODS FOR CREATING INTEGRATED APPLICATIONS FOR ELECTRONIC DEVICES

(76) Inventors: Paul Hershenson, La Crescenta, CA (US); John Michael Opferkuch, Encinitas, CA (US); Touradj Barman, San Diego, CA (US)

( * ) Notice: Subject to any disclaimer, the term of this patent is extended or adjusted under 35 U.S.C. 154(b) by 0 days.

(21) Appl. No.: 13/279,300

(22) Filed: Oct. 23, 2011

(65) Prior Publication Data
US 2012/0117534 A1 May 10, 2012

Related U.S. Application Data

(60) Provisional application No. 61/455,511, filed on Oct. 22, 2010.

(51) Int. Cl.
G06F 9/44 (2006.01)
(52) U.S. Cl.
CPC ...................................... G06F 8/38 (2013.01)
(58) Field of Classification Search
CPC .. G06Q 10/06; G06F 8/10; G06F 8/20; G06F 8/24; G06F 8/34
USPC ........................................................ 717/105
See application file for complete search history.

(56) References Cited

U.S. PATENT DOCUMENTS

| 8,078,673 B2 * | 12/2011 | Hines ............................ 709/203 |
| 8,595,186 B1 * | 11/2013 | Mandyam et al. ............ 707/632 |
| 2004/0240408 A1 * | 12/2004 | Gur ................................ 370/328 |
| 2008/0195997 A1 * | 8/2008 | Herberger et al. ............ 717/100 |
| 2010/0076956 A1 * | 3/2010 | Ranney et al. ................ 707/722 |
| 2010/0174974 A1 * | 7/2010 | Brisebois et al. ............. 715/223 |
| 2010/0191578 A1 | 7/2010 | Tran et al. |
| 2010/0281475 A1 * | 11/2010 | Jain et al. ....................... 717/172 |
| 2011/0113089 A1 * | 5/2011 | Priyadarshan et al. ........ 709/203 |

OTHER PUBLICATIONS

Jonathan Trevor, "Doing the Mobile Mesh", Feb. 2008, IEEE, vol. 41, 3 pages.*
Salminen et al., "Developing Client-Side Mashups: E Periences, Guidelines and the Road Ahead", Oct. 2010, MindTrek 2010, Oct. 6-Oct.8, 2010, 8 pages.*
Oleg Beletski, "End User Mashup Programming Environments", Spring 2008, Telecommunications Software and Multimedia Laboratory, T-111.5550 Seminar on Multimedia, 14 pages.*
Xu et al., "Mobile Mashup: Architecture, Challenges and Suggestions", Sep. 2009, IEEE, 4 pages.*
Iqbal Mohomed, "Enabling Mobile Application Mashups with Merlion", Feb. 22-23, 2010, ACM, Proceedings of the Eleventh Workshop on Mobile Computing Systems & Applications., 6 pages.*

* cited by examiner

*Primary Examiner* — Li B Zhen
*Assistant Examiner* — Hui-Wen Lin

(57) ABSTRACT

The present technology relates to providing application users methods and systems for dynamically loading an entire application, or a portion of another application, within a currently operating application without having to (a) exit that first application or (b) download the executable code for the other application or part of the other application. For example, in one embodiment, a method of making a mobile application includes: providing a content layout of the mobile application; receiving content to populate the content layout of the mobile application; and providing an executable framework that matches the content to the content layout to render the mobile application.

17 Claims, 10 Drawing Sheets

| FIG. 2A |
|---------|
| FIG. 2B |

FIG. 2

```
Antiquorum.json
1  {
2    "JsonMessage":
3    {
4      "response":
5      {
6        "MobileLayout":
7        {
8          "event": null,
9          "content_item_sets":
10         [
11         ],
12         "show_nav_logo": true,
13         "show_nav_logo": false,
14         "last_modified": "2011-07-26 16:22:29",
15         "contact_email": "newyork@antiquorum.com",
16         "location_sets":
17         [
18           {
19             "LocationSet":
20             {
21               "title": "ANTIQUORUM_LOCATIONS",
22               "vid": "b1f16bdb49ed4956a3474c9843083714",
23               "locations":
24               [
25                 {
26                   "Location":
27                   {
28                     "city": "Geneva",
29                     "fax": "+41 (0) 22 909 28 60",
30                     "subtitle": "Antiquorum Geneva SA",
31                     "vid": "eb73f51fef3d4dd4b20f945f37a278e0",
32                     "title": "Geneva",
33                     "country": "CH",
34
```

FIG. 2A

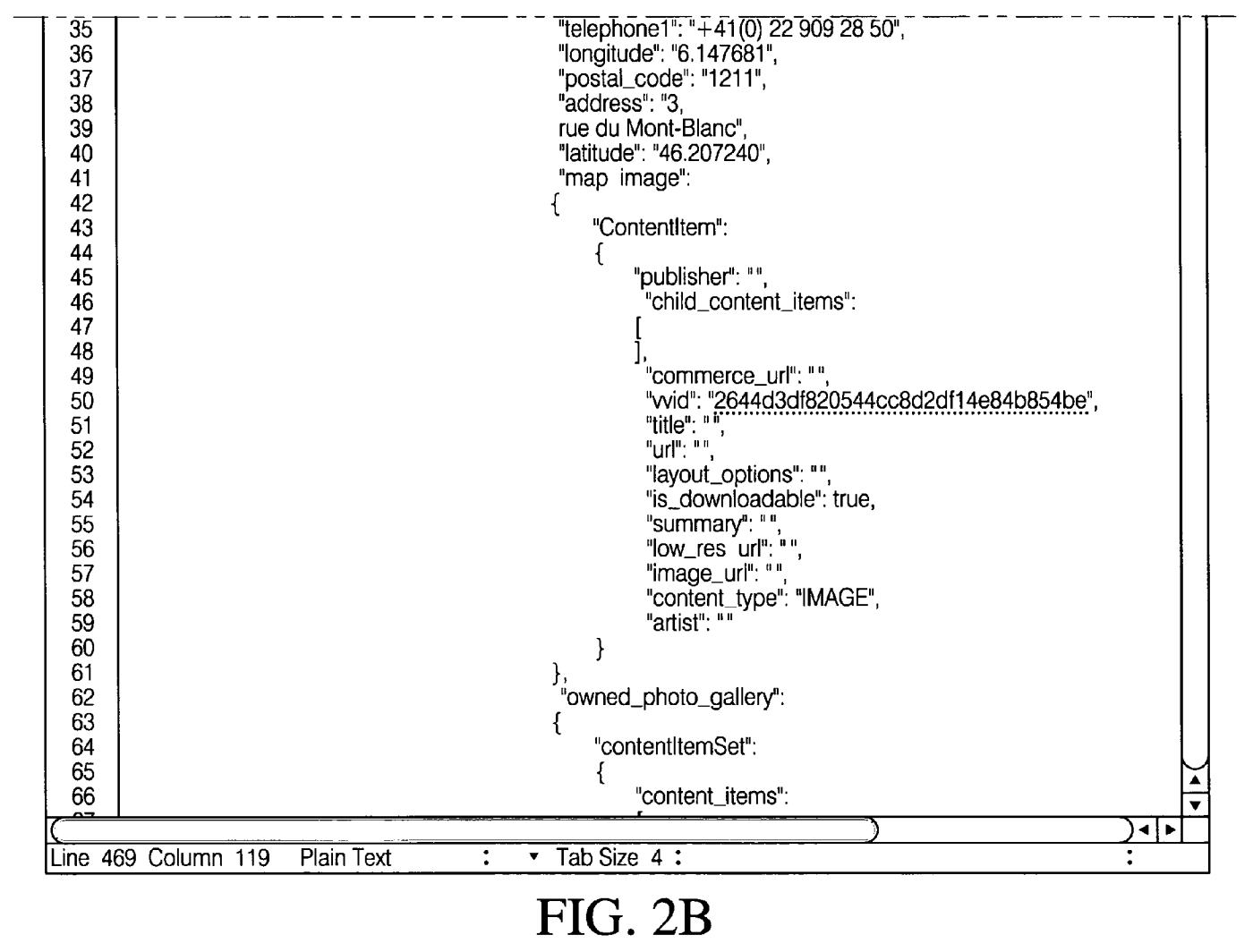

```
35    "telephone1": "+41(0) 22 909 28 50",
36    "longitude": "6.147681",
37    "postal_code": "1211",
38    "address": "3,
39    rue du Mont-Blanc",
40    "latitude": "46.207240"
41    "map image":
42    {
43       "ContentItem":
44       {
45          "publisher": "",
46          "child_content_items":
47          [
48          ],
49          "commerce_url": "",
50          "vid": "2644d3df820544cc8d2df14e84b854be",
51          "title": "",
52          "url": "",
53          "layout_options": "",
54          "is_downloadable": true,
55          "summary": "",
56          "low_res_url": "",
57          "image_url": "",
58          "content_type": "IMAGE",
59          "artist": ""
60       }
61    },
62    "owned_photo_gallery":
63    {
64       "contentItemSet":
65       {
66          "content_items":
```

FIG. 2B

SYSTEMS AND METHODS FOR CREATING INTEGRATED APPLICATIONS FOR ELECTRONIC DEVICES

CROSS-REFERENCE TO RELATED APPLICATIONS

This application claims the benefit of U.S. Provisional Patent Application No. 61/455,511, filed on Oct. 22, 2010, which is hereby incorporated by reference herein in its entirety.

FIELD OF THE DISCLOSURE

This disclosure is directed to providing enhanced access to creating integrated applications for use on mobile and/or stationary devices. Using the systems and methods described herein, programmers and non-programmers can quickly, easily and inexpensively create, modify, and publish custom applications.

BACKGROUND

The use of mobile devices (e.g., mobile telephones, tablet computing devices, personal digital assistants ("PDAs"), smart phones) in the United States and around the world has increased dramatically in the past decade. Consequently, the proliferation of mobile device usage has engendered corresponding advances in mobile device technology, including advances in accessing and using multimedia content.

Much a of user's time is spent in "applications" on the mobile devices. For example, many users utilize their mobile devices as a GPS device for mapping, as a portal to various social networking applications, and as a gaming device. Only a small percentage of a user's operation of the device may be spent as an actual phone.

Since applications have become such a large way of delivering access to content and functionary on mobile devices, and since the cost (in terms of money, time, skill, etc.) is so great to build these applications, there exists a barrier to the further proliferation of applications. Thus, there is a need for removing or overcoming this barrier, making it much easier, quicker, and/or cheaper to create mobile applications.

SUMMARY

Additional features and advantages of the disclosure will be set forth in the description which follows, and in part, will become more fully apparent from the description, the appended claims, or can be learned by practice of the herein disclosed principles set forth herein.

The present technology relates to providing application users methods and systems for dynamically loading an entire application, or a portion of another application, within a currently operating application without having to (a) exit that first application or (b) download the executable code for the other application or part of the other application. A benefit of being able to move from one application to another without having to exit the first application is that the user is able to navigate in a more flexible, fluid environment, similar to a web browser. This allows the user to quickly navigate between applications and move content from one application to another if desired.

For example, in one embodiment, a method of making a mobile application includes: providing a content layout of the mobile application; receiving content to populate the content layout of the mobile application; and providing an executable framework that matches the content to the content layout to render the mobile application.

In another embodiment, a mobile application system includes: a first mobile application having first core information and an encasement, where the first core information includes a structured data file describing a first content layout and first content and where the encasement includes an executable framework that enables the functioning of the structured data file; and a portion of a second mobile application, where the second mobile application includes second core information, the second core information including a structured data file describing a second content layout and second content, where the encasement from the first mobile application is configured to enable the functioning of the structured data file of the portion of the second mobile application.

In another embodiment, a computer-implemented method includes: running a first mobile application on a mobile device; requesting a portion of a second mobile application by the first mobile application for display within the first mobile application; receiving the portion of the second mobile application from a remote server; and presenting the portion of the second mobile application in the first mobile application.

In yet another embodiment, a system includes: a server configured to send a first mobile application and a portion of a second mobile application; and a mobile device configured to receive the first mobile application and portion of the second mobile application; where the portion of the second mobile application is run within the first mobile application.

In yet another embodiment, a system for building a mobile application for use on a mobile device includes: a server for storing one or more structured data files, the one or more structured data files defining one or more modules; and a user interface for presenting the one or more modules to a user; wherein the user is able to select one or more modules from the user interface to create a mobile application and populate content into the one or more modules.

BRIEF DESCRIPTION OF THE DRAWINGS

In order to describe the manner in which the above-recited and other advantages and features of the disclosure can be obtained, a more particular description of the principles briefly described above will be rendered by reference to embodiments which are illustrated in the appended drawings. Understanding that these drawings depict exemplary embodiments of the disclosure and should not be considered to be limiting of its scope, the principles herein are described and explained through the use of the accompanying drawings in which:

FIG. 2 illustrates an exemplary screen shot showing a JSON instruction;

DETAILED DESCRIPTION

Embodiments of the present technology provide systems and methods for allowing developers of mobile applications (e.g., applications that can be downloaded and executed on a mobile device) to quickly, easily and inexpensively create, modify, and publish custom applications.

The systems and methods described herein may allow application users to dynamically load an entire application, or a portion of another application, within a currently operating application without having to (a) exit that first application or (b) download the executable code for the other application or part of the other application. Essentially, the systems and methods described herein may split an application into two parts: (1) the executable framework or "encasement" and (2) the content, functionality and layout descriptors, or "internals". The systems and methods described herein may make mobile applications more dynamic, thereby allowing users to switch between applications or portions of applications without having to download entire new applications. For example, currently, if a user wants to put a new application on his smart phone, the user would probably go to his smart phone's "App Store" portal and download that application. This action requires the user to exit the application he is currently using, open a new application (e.g., the one that is in the App Store), search for and find the new application he wants, download it, then run it.

In contrast, in the present systems and methods, the "encasement" or executable framework can be downloaded once, then a user can navigate from one application to another by dynamically loading (e.g., downloading) only the internals or partial internals of the other applications. As can be appreciated, downloading internals or partial internals is generally quicker and does not require the user to quit his currently running application and return to the App Store. The user thereafter navigates from internals in one application to internals in another, all within the same encasement application.

A benefit of using the encasement is that it serves to make applications less like "islands". For example, in traditional desktop computing, applications were like islands, meaning that they operated fairly independent of each other. One of the big innovations of web browsers, was that different sites (e.g., websites) were connected, so without leaving a main application (the browser), users could navigate to entire other sites or portions of other sites. Thus, for simplicity, the web browser and website model can be thought of analogous to the encasement and internals described herein.

Figure 1:
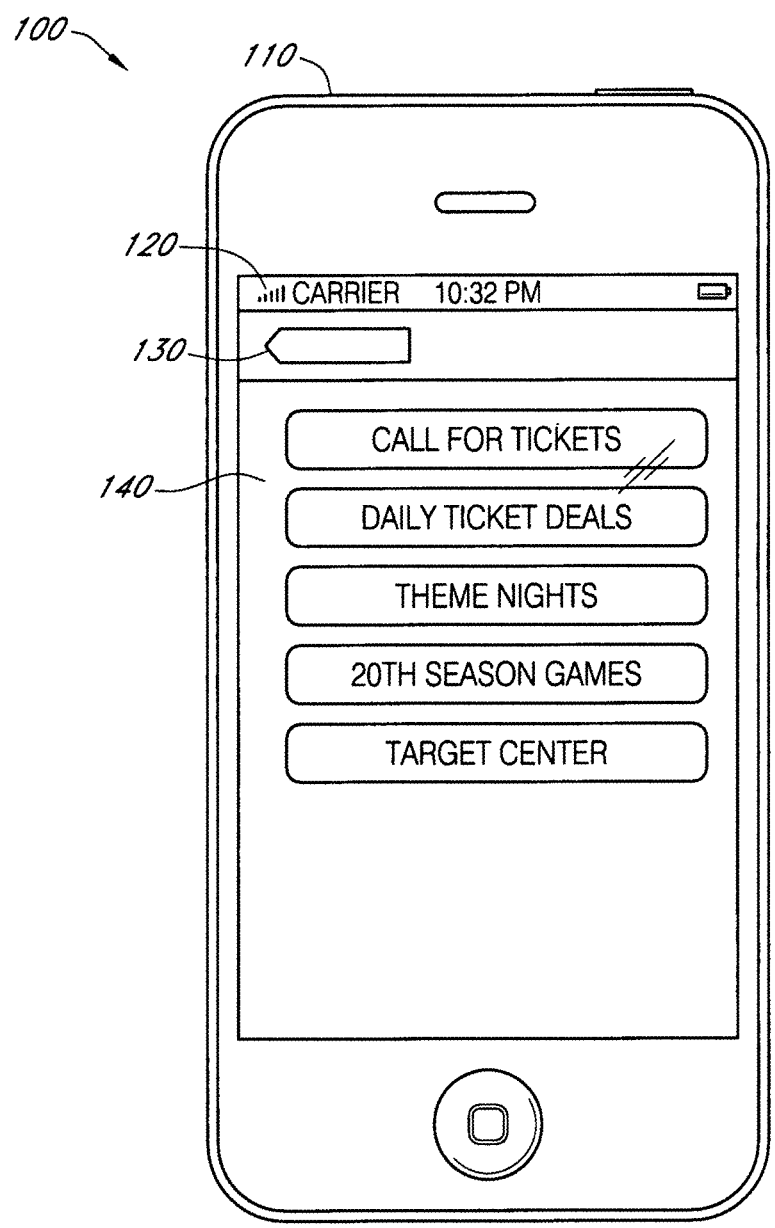
FIG. 1 illustrates an exemplary embodiment of an application running on a mobile device.

Referring initially to FIG. 1, a screenshot of an example application operating on a touchscreen smartphone 100 is shown. The screen 110 illustrates a list of buttons 140 selectable on the smartphone touchscreen 110 within the example smartphone application. For example, one of the options may be to initiate a phone call. Those of ordinary skill in the art would recognize that the applications developed for the smartphone platform may be designed to integrate with existing technology and features of the phone and phone user interface 120, such as phone call functions, audio functions, internet connectivity, GPS, and the like. Other typical application user interface features such as navigation and menu options 130 may also be presented within the smartphone application.

In one embodiment, the application user interface that operates on the smartphone may also be generated and displayed in a mobile web page format. This format may be accessible via the internet or a mobile communication network, or packaged and distributed to smartphones directly. Providing a user interface for mobile browsers may enable unsupported smartphones to gain access to substantially the same content and design as the deployed mobile applications.

JavaScript is a scripting language often used for client-side web development. Although best known for its use in websites (as client-side JavaScript), JavaScript is also used to enable scripting access to objects embedded in other applications. The primary use of JavaScript is to write functions that are embedded in or included from HTML pages and interact with the Document Object Model (DOM) of the page. Other scripting languages include VBScript and ECMAScript. For example, scripting languages may be used to open or "pop up" a new window with programmatic control over the size, position and look of the new window or to validate web form input values before they are submitted to a server.

JSON, or JavaScript Object notation, is a general-purpose data interchange format that is defined as a subset of JavaScript. JSON is a text-based, human-readable format for representing simple data structures and associative arrays (called objects). The JSON format is often used for transmitting structured data over a network connection in a process called serialization. JSON is primarily used in Ajax web application programming, where it serves as an alternative to the use of the XML. As used hereinafter, information described using JSON will be referred to as a structured data file ("SDF"). An exemplary screen shot showing a JSON instruction is provided in FIG. 2.

It should be appreciated that other formats beside JSON can be used to create an SDF. For example, XML, SOAP, or the like may alternatively be used to create SDFs. In some embodiments, provided that the format is a human-readable (e.g., non-compiled), structured data format that can be used to describe things (e.g., content, features, layout, etc.) that belong in an application, it may be used to create an SDF.

In some embodiments, an SDF describes the content, layout and other functionality in an integrated application. As used hereinafter, "integrated application" or "application" or "app" all refer to applications that can be downloaded and executed on mobile or stationary devices. In the most general sense, SDF is non-compiled code used to create an application, similar to how an HTML file is used to create a website.

Through the use of SDFs, a user can create various modules that can be used to create a customizable application. For example, in some embodiments, each SDF may be represented as a "module" and presented to the user by way of a graphic user interface ("GUI") editor.

In some embodiments, an SDF can describe an entire application, or a portion of an application. A customizable application can be thought of as the sum of its modules, whatever breakdown of content exists in those modules, and certain overarching data for the whole application (e.g., name, description, splash screen, color scheme, layout features, etc.). Consequently, if a given application wants to open just a content item (e.g., a song) that exists in a portion of a module, it can open just that part.

Figure 3:
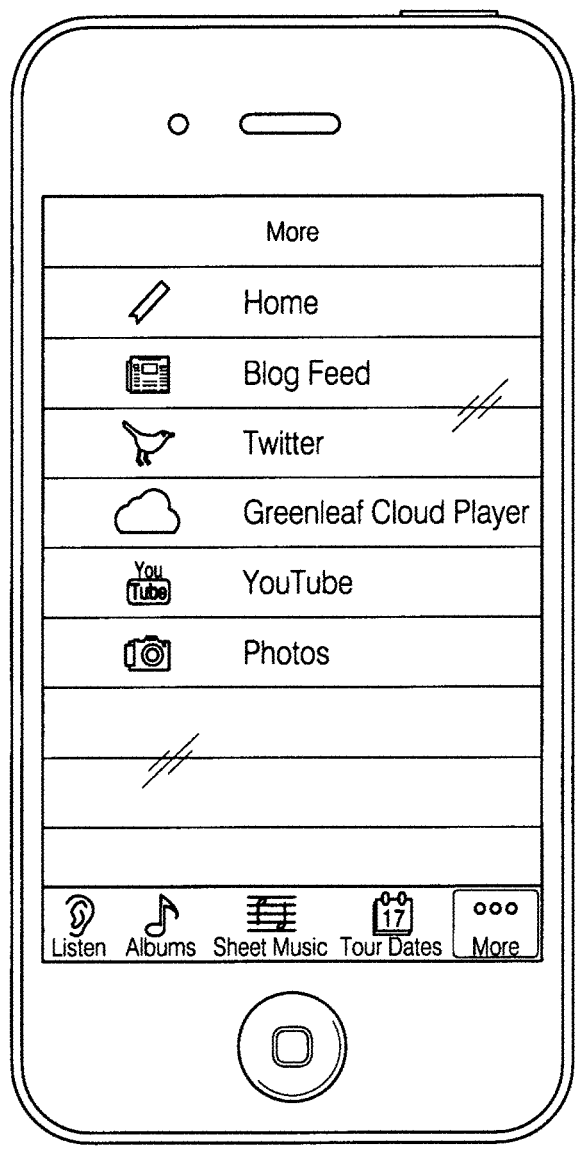
FIG. 3 illustrates an exemplary screen shot of exemplary modules offered via a graphic user interface ("GUI")

Referring now to FIG. 3, FIG. 3 shows an exemplary screen shot of exemplary modules offered via the GUI. Such modules may include, for example, web content, news (e.g., RSS) feeds, images, audio playback, artist profiles, discography, global positioning system ("GPS")-based locations, location search, video listing and playback. As used herein, modules typically contain structured sets of content, such as a photo, video or audio gallery, graphics, text, executable code, or any combinations thereof. In some embodiments, modules also describe functionality such as "user contact form" whereby a user can submit text and/or media back to a server; printing of content, sharing of content via social media application programming interfaces ("APIs"), using device GPS data to execute a search of location data stored on a server.

In accordance with certain embodiments, the GUI editor provides a way for a user (programmer or non-programmer) to select modules describing various application parts (e.g., audio playback, discography, web content, image gallery, locations listing and search, news feed (RSS) display, user contact form, video listing and playback) to create a custom application. In the most general sense, the use of the modules to create an application is similar to creating a webpage using Microsoft FrontPage. This resulting custom application is described by a corresponding application SDF, which is constructed from the selected parts or modules.

Once a user is finished selecting the modules in the custom application, the user then provides his content to be entered into the custom application (e.g., the user populates his content into the modules designed to hold it). The user may do this by logging into his account at a website or user interface, selecting or clicking on an "edit" link for any given module, and inputting data (e.g., physically entering or uploading data). Such data may include, for example, section title, section icon, and section color scheme. Module-specific configuration data may include, for example, uploading or linking to digital media (e.g., images, audio files, video, web content), entering a list or lists of locations (e.g., store locations for a franchise), configuring news feed URLs, etc.). Alternatively, the user may enter his content descriptor information (e.g., content) directly into the SDFs.

Thereafter, a "stem cell" application ("SCA") combines the user's content or information with the custom application to form a personalized application. Consequently, each personalized application is fabricated from selected modules, user-provided content, and the SCA. In some embodiments, the selected modules and user-provided content may be referred to as part of the "client application." In some embodiments, the client application may be a code element such as a simple wrapper that defines the application identifier, customer identifier, default SDF, application icons and other bundled data. These elements in the client application may generally instruct the framework or SCA how to render the personalized application. In some embodiments, the SCA or framework library may be a reusable set of code that interprets the application SDF data and renders the user interface.

In some embodiments, the SCA can take in different SDFs and convert them into an application interface in real time. In some embodiments, the SCA can load a portion of or a whole SDF, for example, favorite content items, to add them to different lists of favorite content items, etc.

Figure 4:
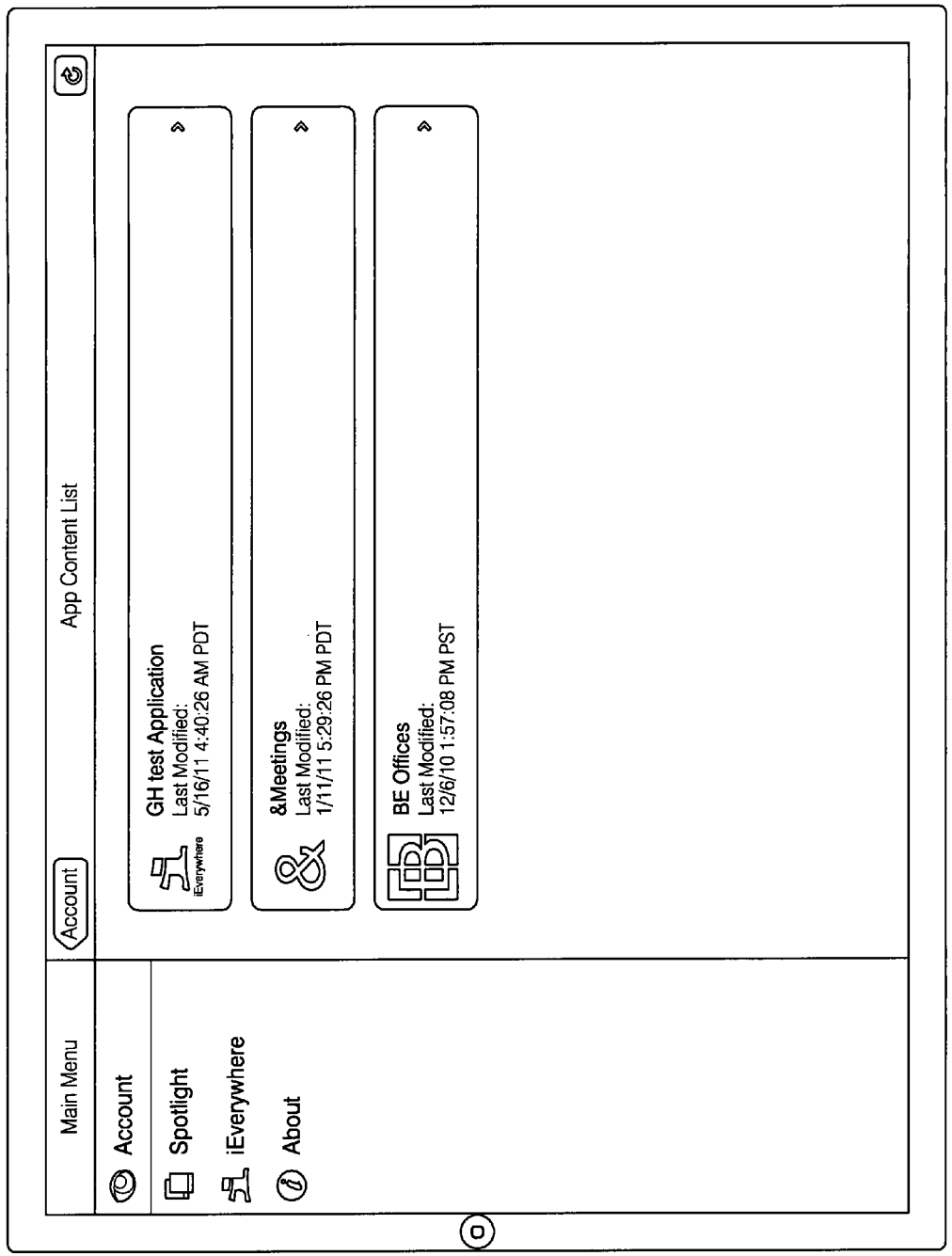
FIG. 4 illustrates an exemplary screen shot of an exemplary application created by user.

In some embodiments, after the SCA forms a personalized application, the user may choose to finalize or publish the application. The personalized application may be "hardwired" such that the specific SDF is coupled to the SCA permanently (e.g., it's the final application that the user publishes in an application store for purchase). For example, FIG. 4 shows an exemplary application created using the SCA.

As mentioned above, the SCA cannot only take in one pre-set SDF, but can load one or more SDFs (or portions of SDFs) dynamically. In other words, after logging into an account, a user can see a list of applications (or SDFs) in the account and select one to load. Using the SCA, the selected SDF then turns into the application. The user can then exit the application (SDF being run) and return to the list to select another SDF to run.

Figure 5:
FIG. 5 illustrates an exemplary screen shot of an exemplary second application viewed within an exemplary first application (or previewed by user)

This allows more than one SDF or application to operate within a single application. FIG. 5 is a screen shot of a second application's user interface (second SDF) loaded from a first application's user interface (first SDF). For example, an application may be described by an SDF that, in its modules, contains links to other SDFs. Alternatively, the user may be in an application and then dynamically load a portion of another SDF (e.g., a Global Favorites List). For example, if a user is in one application that is being run from a first SDF, the user can add content items from that application into an account that holds references to content items or sections of the application, such as a Favorites List. In one embodiment, an item on a Favorites List can be thought of as a hyperlink to a portion of content described in another SDF. Then, anywhere the user can access that Favorites List, the user can pull up content or functionality from other applications because the user will just be referencing portions from the SDFs that point to the content desired.

It should be appreciated that there may be multiple paths or methods for receiving the SDFs. For example, an SCA can receive SDFs by email, by a URL that points to an SDF, searching for an SDF on a network, etc. Alternatively, an SDF can be hardwired to the application upon being published.

Figure 6:
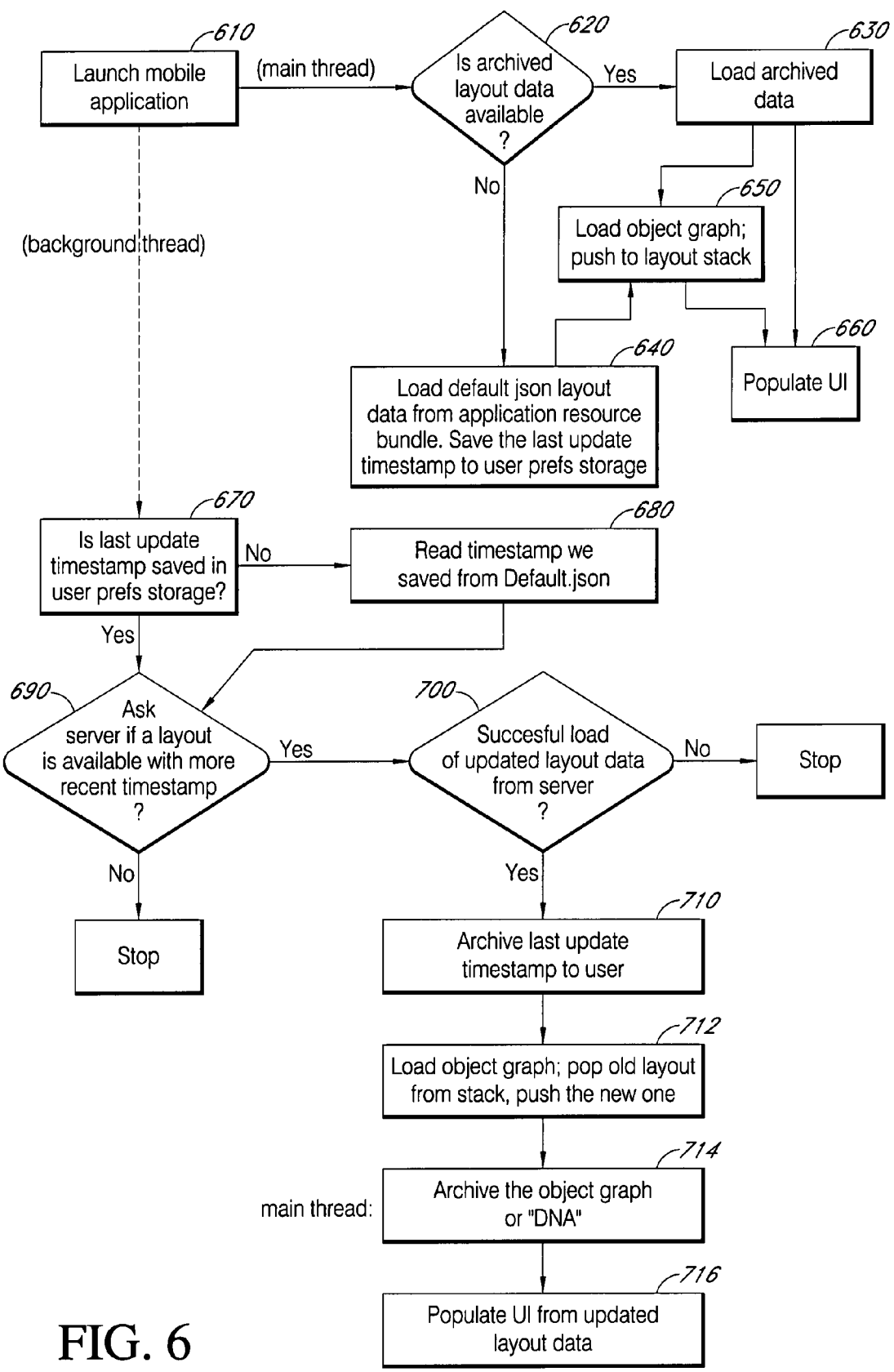
FIG. 6 illustrates an exemplary flow chart depicting how a first application may be created by a user.

Turning now to FIG. 6, an exemplary flow chart depicting how a first application may be created by a user is shown using a system in accordance with some embodiment. In block 610, a user launches an application from a device desktop. Desktop, as used herein, refers to the main screen of a device, mobile or stationary. Thereafter, in block 620, the system determines if there is an "archive" created from a previous application. As used herein, an archive is a serialized representation of the application's contents or internals. In some embodiments, the system determines if there is an archive at initialization or start time.

The serialization method may be platform-specific. In some embodiments, the contents or internals is serialized after loading it from the JSON data, which can come from either a server or a "default.json" coupled with the application (e.g., shipped with the application). If there is an archive, the archived contents may be used to populate the user interface, as shown in block 630.

If, however, there is no archive available, the system uses the default JSON coupled, or shipped with the application (e.g., default.json), as shown in block 640.

It should be appreciated that the contents or internals may be the information the user configures to define the application (e.g., using the GUI), represented in any data format, including json, serialized binary file, etc. Consequently, regardless of whether the content or internals is obtained from JSON or a serialized archive, the end result is a hierarchical representation of the application's appearance and content that can be used to populate the user interface using native code. This representation may alternatively be described as an "object graph"—a tree of objects containing properties and data.

In block 650, the system pushes the layout content to a standard first-in/first-out ("FIFO") "stack". This FIFO stack allows layouts to be nested (see FIG. 7). Thereafter, in block 660, the user interface ("UI") is populated. In an embodiment, populating the UI means taking the content and rendering the device-specific UI (and associated content and functionality) according to pre-designated settings (e.g., settings defined or saved on a server).

Collectively, blocks 610-660 may be referred to as the "main thread" operating in the application. After the application begins running, the system determines if there is a newer version of the layout content is available (e.g., on a server) in a "background thread". Background thread may include blocks 670-710, discussed below.

In block 670, the system acquires (e.g., loads) the timestamp of the most recently downloaded content from the user's storage. If there is no timestamp found, it is determined that this is the first time the application has been run. Consequently, in some embodiments, the system compares the timestamp from the default.json against the timestamp on the server, such as shown in block 680.

In block 690, the system makes a request (e.g., an http request) to the server asking if a more recent layout content is available. If there is a more recent content layout available, the system attempts to download it, in block 700. Data may be delivered in any suitable format, such as json, XML, etc.

If the content download fails, then the system stops the thread and the user sees the UI populated in block 660. If there is no more recent content available, the user sees the UI populated in block 660.

If new content is retrieved, the system extracts the content's timestamp and saves it to user preferences for later use in block 710. Thereafter, the system serializes the layout data or content to a platform-specific format in blocks 712 and 714 and populates the UI with the updated layout in block 716.

Figure 7:
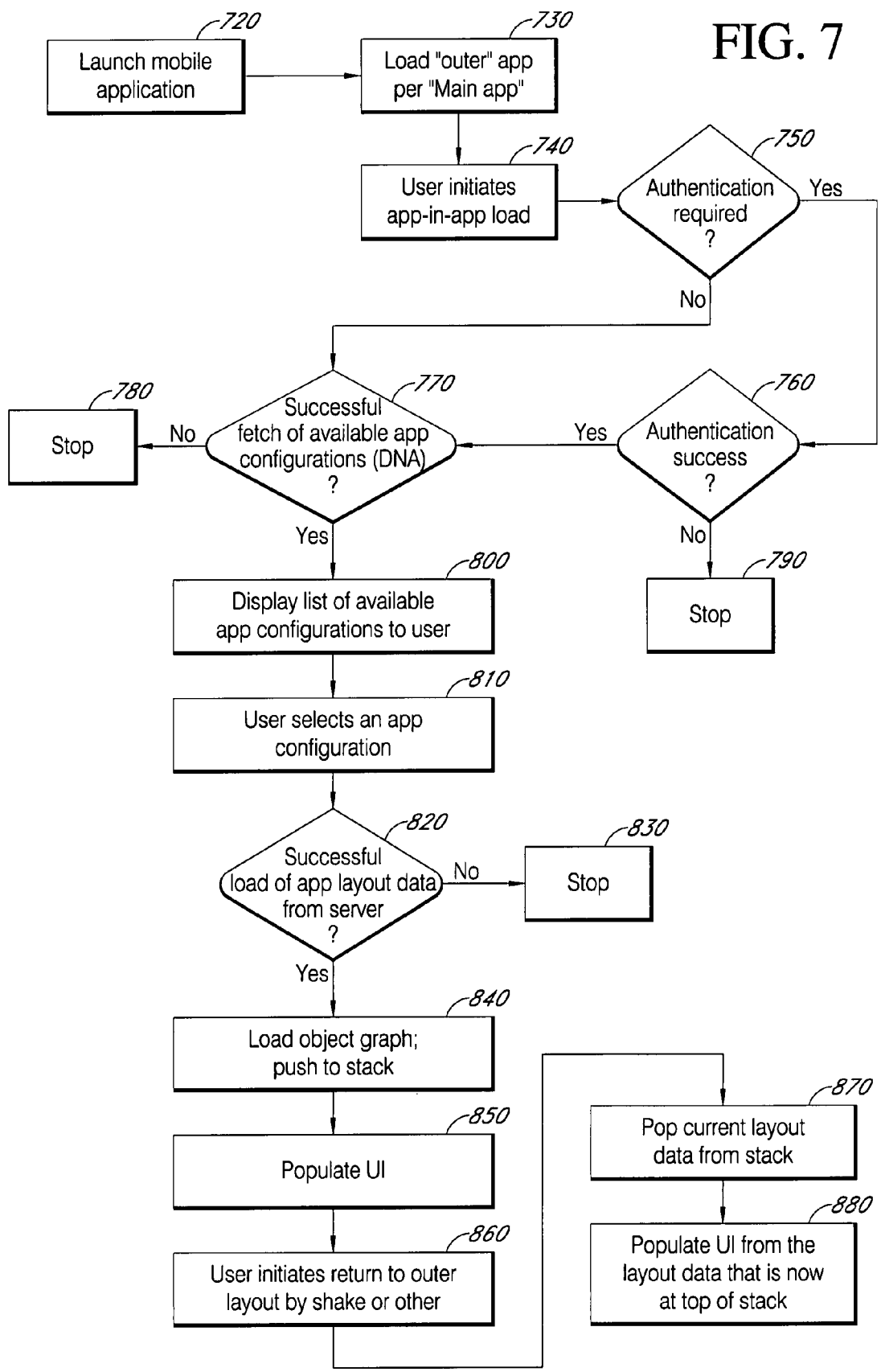
FIG. 7 illustrates an exemplary flow chart depicting how a second application may be previewed in a first application.

Turning now to FIG. 7, an exemplary flow chart depicting how a second application may be previewed in a first application using a system in accordance with some embodiments. In block 720, the user launches an application, such as described in FIG. 6. The user will see the "main application" sheet in block 730, and can choose to load "preview" or "app in app" content, in block 740. For example, in block 730, the user can see a list of available application SDFs. The contents of the list may vary. If the user is a subscriber or customer to a service that provides the SDFs, the user can see the application SDFs in the user's account. In some embodiments, the user may see other related applications or subsections/portions of sections from other applications.

If authentication is required to view selected content, the system authorizes the user using some standard mechanism, in block 750. If the authorization is successful at block 760, the system loads a list of available content from a server in block 770. For example, the system may download various data, e.g., App title, thumbnail image, app ID, etc. in json format. If the load list fails, the user is shown an error message at block 780.

If authentication is not successful, the user is shown a dialog at block 790, and redirected to block 740.

After the system successfully loads a list of available content from a server in block 770, the system displays a list of available application layouts in a standard UI (e.g., table view) in block 800. Thereafter, the user chooses an application configuration to load in block 810.

The system may request to load layout content from a server in block 820. If the request fails, an error message is shown in block 830.

If the system loads the layout content, the system loads an object graph and pushes the current layout content to the FIFO stack, in block 840. The executable framework or encasement then populates the UI per the data from the layout content in block 850.

The user may choose to return to the first layout in block 860. This may be initiated by a standard UI gesture, including, for example, shake, button press, etc. Thereafter, in block 870, the system pops the current layout from the stack, bringing the previous layout to the top. The UI is then populated with data in the system's current content in block 880. At the point, the user returns to whatever UI view that the user had previously been viewing. For example, if the user was logged into an account on a mobile device, the user would return back to his list of available application layouts.

A benefit associated with the present embodiments include that an application represented by an SDF can always be kept up-to-date. For example, there is no need to update an application and resubmit it to the, e.g., Apple App Store, then require the user to re-download or download the updated version from the, e.g., Apple App Store. This is because the user programs the modules of their application (SDF) in an account on a website and whenever the user saves a change to their application, they have saved an updated version of the SDF on a server. Thereafter, whenever the application is started by a user, it checks with the server and compares the date and time stamp of the SDF it has locally to the one available from the server. If the server has a newer copy, it downloads that SDF and then runs it. Thus, the application has the latest content and the user is able to update their application without having to submit a revision of their application, e.g., to the Apple App Store, for user re-download. Submitting an application to the App Store for an update is disadvantageous for many reasons: it takes time—often 1-2 weeks—to be reviewed, there is risk that it may not be approved, it takes programmer or administrator time and effort to do this, the end user must download the updated application to replace the out-of-date version, etc.

In some embodiments, when the application is first submitted to an App Store, e.g., Apple App Store, Android Market, BlackBerry App World, or even private hosting of an app, it is pre-loaded with the latest version of the SDF available at the time it was submitted to the App Store. In other embodiments, the application may be submitted to the Apple App Store with no SDF stored locally—in which case the file size is smaller—and then the application downloads the latest SDF from the server upon the first time it is opened.

It should be appreciated that the size of the SDF may vary, depending on the content type and structure being described. Thus, in some embodiments, the SDF may be very large. In such embodiments, it may be desirable to download a portion of the SDF at a time. In some embodiments, the SDF may have sub-SDFs nested in it. In such embodiments, the user may download the main SDF and then the sub-SDFs dynamically or as needed.

Figure 8:
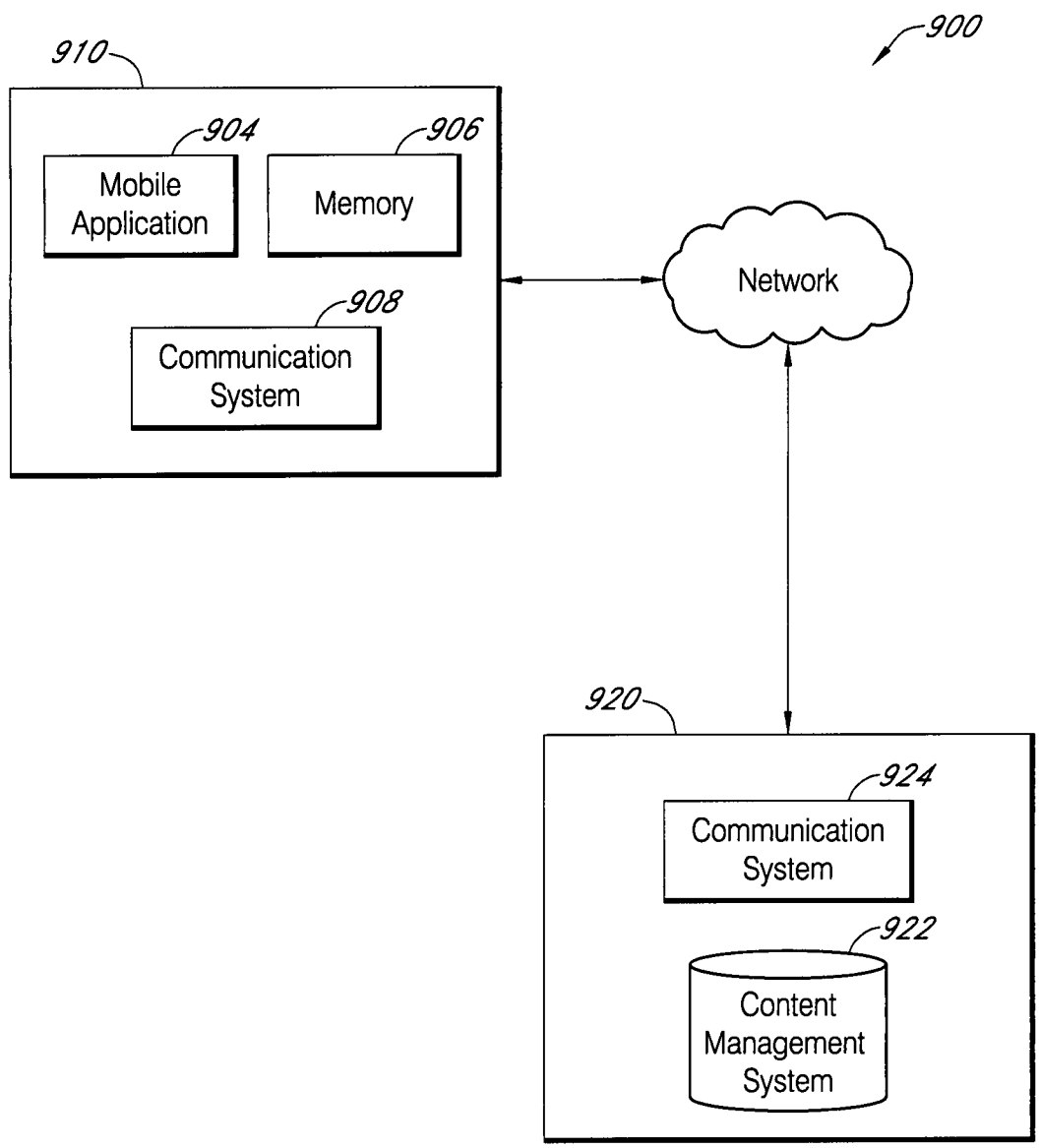
FIG. 8 illustrates an exemplary mobile phone communicating with an exemplary server.

Referring now to FIG. 8, an exemplary system 900 including a mobile device 910 is shown communicating with a server 920. In some embodiments, the mobile device 910 includes one or more software modules and hardware components. As illustrated, the mobile device 910 includes a mobile application 904, a memory 906, and a communication system 908. The mobile application 904 may allow users to access the UI tools and move from one application to another. The memory 906 may provide a backup copy for all or a portion of mobile application 904. In some embodiments, the memory 906 may also store a portion (e.g., a duplicate of the most accessed content) of the content from the content management system 924 (discussed below). The communication system 908 may allow for communication and transfer of data or content to/from server 920.

The server 920 is shown including a content management system 922 and a communication system 924. In some embodiments, the server allows an end user to configure the information in the application SDF via content management system ("CMS") 922. It can be appreciated that the details of how the content presented in the SDF are entered into server 920 may not matter to mobile application 904. For example, as long as the SDF is in the required format and references valid media and/or other links, then the mobile application 904 will likely be able to render the SDF into a user interface.

Still referring to server 920, communication system 924 may allow for communication and transfer of data or content to/from mobile device 910. For example, server 920 should be able to send appropriate application SDF(s) to a mobile device 910 configured to use the executable framework or encasement. In some embodiments, the executable framework expects the server 920 to expose a well-defined set of urls that return, e.g., application SDF, timestamp information, and possibly application content such as web pages, images, etc.

While not wishing to be bound to any particular configuration, benefits and/or features associated with the present systems and methods may include:

1. A mobile application may be constructed from two parts: (A) the executable framework that does the heavy lifting, e.g. playing a video, playing a song, etc. and (B) the layout, content data and features to be available in the application.
2. A GUI/Website that a non-programmer can use to select and configure "modules" to compose his app. The output from this GUI may be one or more "SDFs".
3. The SDF describes what content and features should be in an app and how they should be arranged.
4. An encasement app, or Stem-Cell App (SCA) that can ingest an SDF and produce a whole app.
5. An SCA that is tied to a specific SDF to form a complete app to be distributed to users, e.g., through an App Store.
6. An SCA that is tied to an SDF can check a server and retrieve and load an updated SDF if it is available.
7. An SCA that is tied to a specific SDF, but not have that SDF packaged with it during distribution, whereby the SCA may download a copy of its SDF upon the first time it is loaded.
8. An SCA that can dynamically load various SDFs.
9. An SCA dynamically loads an SDF to "Preview" a complete app. This app can later be published by tying its SDF to an SCA and distributing it to users, e.g. though an App Store.
10. An SCA that is tied to an SDF can contain within it a link to another SDF and dynamically download and load that new SDF to "transform" into the other app. Here the user experience may equates to switching to new apps (a) without having to download those new apps and (b) without having to exit the first app.
11. The ability for an app to open just a portion of an SDF. For example, a first app can open a piece of content that would ordinarily be in the second app by reading the second app's SDF and retrieving the data describing a particular piece of content. For example, a Michael Jackson app could open and play a song from a Madonna app.
12. The ability for the user to store, edit and access lists of full apps in a first app. By clicking on an app in that list, the user jumps to the app clicked on. The encasement loads the SDF that defines the app clicked on and turns into it. This is, e.g., a Favorites List of apps.
13. The ability for the user to store, edit and access lists of portions of apps in a first app. By clicking on an item on that list, the user accesses the content referenced from that SDF. This is, e.g., a Favorites list of content.
14. The ability to for the user to store, edit and access a list that combines full apps and portions of apps.
15. The ability for an SCA to access an SDF that describes an entire app, but just load a portion of it.
16. The ability for an SCA to access just a portion of an SDF, enough to access one or more content items of that app.
17. The SDF defines not just the modules of content to be in an app, but it can define other attributes like the name of the app, its icon and splash screen, its layout, etc. Where an SDF defines a module, this would include things like its name, representative icon, the type of content included, the location of that content, how to display that content, etc.

Figure 9:
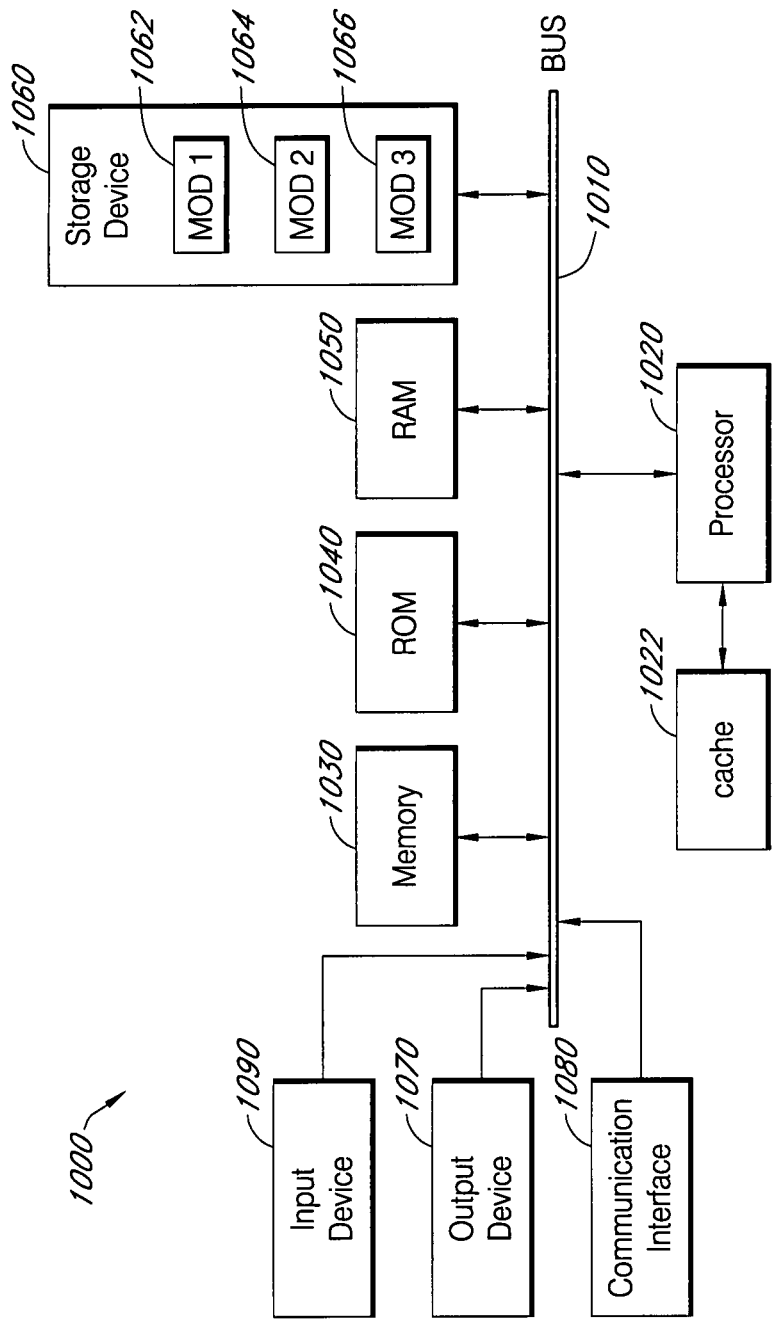
FIG. 9 illustrates an exemplary computer system.

Referring now to FIG. 9, an exemplary system 1000 used to execute methods described herein is shown. System 1000 includes a general-purpose computing device 1000, including a processing unit (central processing unit ("CPU") or processor) 1020 and a system bus 1010 that couples various system components including the system memory 1030 such as read only memory ("ROM") 1040 and random access memory ("RAM") 1050 to the processor 1020. The system 1000 can include a cache 1022 of high speed memory connected directly with, in close proximity to, or integrated as part of the processor 1020. The system 1000 may copy data from the memory 1030 and/or the storage device 1060 to the cache 1022 for quick access by the processor 1020. In this way, the cache can 1022 provide a performance boost that minimizes or avoids processor 1020 delays while waiting for data. These and other modules can be configured to control the processor 1020 to perform various actions. In some embodiments, other system memory 1030 may be available for use as well. The memory 1030 can include multiple different types of memory with different performance characteristics. It should be appreciated that the disclosure may operate on a computing device 1000 with more than one processor 1020 or on a group or cluster of computing devices networked together to provide greater processing capability.

In some embodiments, the processor 1020 can include any general purpose processor and a hardware module or software module, such as module 1 1062, module 2 1064, and module 3 1066 stored in storage device 1060, configured to control the processor 1020 and/or alternatively a special-purpose processor (not shown) where software instructions are incorporated into the actual processor design. The processor 1020 may essentially be a completely self-contained computing system, containing multiple cores or processors, a bus, memory controller, cache, etc. A multi-core processor may be symmetric or asymmetric.

The system bus 1010 may be any of several types of bus structures including a memory bus or memory controller, a peripheral bus, and a local bus using any of a variety of bus architectures. A basic input/output (BIOS) stored in ROM 1040 or the like, may provide the basic routine that helps to transfer information between elements within the computing device 1000, such as during start-up. The computing device 1000 may further include storage devices 1060 such as a hard disk drive, a magnetic disk drive, an optical disk drive, tape drive or the like. The storage device 1060 can include software modules 1062, 1064, 1066 for controlling the processor 1020. Other hardware or software modules are contemplated. The storage device 1060 may be connected to the system bus 1010 by a drive interface. The drives and the associated computer readable storage media may provide nonvolatile storage of computer readable instructions, data structures, program modules and other data for the computing device 1000. In one embodiment, a hardware module that performs a particular function includes the software component stored in a non-transitory computer-readable medium in connection with the necessary hardware components, such as the processor 1020, bus 1010, display 1070, and so forth, to carry out the function. The basic components are known to those of skill in the art and appropriate variations are contemplated depending on the type of device, such as whether the device 1000 is a small, handheld computing device, a desktop computer, or a computer server.

Although the exemplary embodiment described herein employs the hard disk 1060, it should be appreciated by those skilled in the art that other types of computer readable media which can store data that are accessible by a computer, such as magnetic cassettes, flash memory cards, digital versatile disks, cartridges, RAM 1050, ROM 1040, a cable or wireless signal containing a bit stream and the like, may also be used in the exemplary operating environment. In some embodiments, non-transitory computer-readable storage media expressly exclude media such as energy, carrier signals, electromagnetic waves, and signals per se.

To enable user interaction with the computing device 1000, an input device 10100 represents any number of input mechanisms, such as a microphone for speech, a touch-sensitive screen for gesture or graphical input, keyboard, mouse, motion input, speech and so forth. An output device 1070 can also be one or more of a number of output mechanisms known to those of skill in the art. In some instances, multimodal systems enable a user to provide multiple types of input to communicate with the computing device 1000. In some embodiments, the communications interface 1080 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1020. The functions these blocks represent may be provided through the use of either shared or dedicated hardware, including, but not limited to, hardware capable of executing software and hardware, such as a processor 1020, that is purpose-built to operate as an equivalent to software executing on a general purpose processor. For example the functions of one or more processors presented in FIG. 9 may be provided by a single shared processor or multiple processors. (Use of the term "processor" should not be construed to refer exclusively to hardware capable of executing software.) Illustrative embodiments may include microprocessor and/or digital signal processor ("DSP") hardware, ROM 1040 for storing software performing the operations discussed below, and RAM 1050 for storing results. Very large scale integration ("VLSI") hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1000 shown in FIG. 9 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module.

Still referring to FIG. 9, system 1000 may include one or more modules Mod1 1062, Mod2 1064 and Mod3 1066 which are modules controlling the processor 1020 to perform particular steps or a series of steps. These modules may be stored on the storage device 1060 and loaded into RAM 1050 or memory 1030 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Insubstantial changes from the claimed subject matter as viewed by a person with ordinary skill in the art, now known or later devised, are expressly contemplated as being equivalently within the scope of this disclosure. Therefore, obvious substitutions now or later known to one with ordinary skill in the art are defined to be within the scope of the defined elements.

For example, while described using JSON, it should be appreciated that the SDF may be implemented by other scripting languages that can describe the layout and formatting of content or functionality in an application. Additionally, while the term user has been used throughout the specification, it should be appreciated that user may refer to an application "author" or an application end-user or consumer. For example, an application author refers generally to a person configuring application SDF information. An application end-user refers generally to a person that does not have the ability to edit the application content.

The above-described embodiments of the present invention are presented for purposes of illustration and not of limitation.

What is claimed is:

1. A method of making a mobile app publishable to an app store, the method comprising:
   providing a collection of modules from which a user creates a content and functionality layout for the mobile app, wherein each module describes a different mobile app content or functionality component and includes one or more structured sets of content or functionality preferences;
   receiving user provided content and module layout preferences to populate the content and functionality layout of the mobile app, wherein the content and functionality layout and content are stored on a server and collectively described by one or more structured data files;
   providing an executable framework that is independent from the distribution network on a smart mobile device and that is configured to receive and interpret the one or more structured data files and execute the one or more structured data files to render the mobile app having a user interface and operating independent of a web browser;
   coupling the structured data file to the executable framework to render the mobile app, wherein rendering the mobile app includes the executable framework (1) receiving the content layout as a first-in first-out stack, which allows layouts to be nested, (2) serializing the content layout into a platform specific format, and (3) populating the user interface from the content layout to form a complete app; and
   publishing the mobile app to an app store, wherein the mobile app is preloaded with the latest version of the structured data file available when it is published to the app store.

2. The method of claim 1, wherein the structured data file is in JavaScript Object notation (JSON) format.

3. The method of claim 2, wherein the executable framework is configured to ingest the structured data file and render the mobile app.

4. The method of claim 2, wherein the executable framework determines if the structured data file is the most current version by reading a timestamp of the structured data file.

5. The method of claim 1, wherein the content layout is provided via a graphic user interface, which is configured to allow users to select the content layout via graphical representations.

6. The method of claim 1, wherein the content is displayable to the user in the mobile app prior to publishing the mobile app.

7. The method of claim 1, wherein the structured data files describe one or more of the following: the name of an app, the description of the app, the layout characteristics of the app, the color scheme of the app, and the like.

8. The method of claim 1, wherein the one or more modules include one or more of the following: web content, news feeds, images, audio playback, artist profiles, discography, global positioning system ("GPS")-based locations, location search, video listing and playback.

9. A system for building a mobile app for use on a mobile device and publishable to an app store, the system comprising:
   a first server having s a processor and a memory for storing one or more structured data files, the one or more structured data files defining one or more modules, wherein each module describes a different mobile app component;
   a computing device comprising a processor, a memory, a user interface and an executable framework, wherein the user interface is configured for presenting the one or more modules to a user, wherein the user is able to select one or more modules from the user interface to create a content and functionality layout for the mobile app and populate user provided content and functionality into the one or more modules stored on the first server, and wherein the content and functionality is displayable to the user in the mobile app independent of a web browser and each module includes one or more structured sets of content,
   and wherein the executable framework is configured for receiving the one or more structured data files and executing the one or more structured data files to render the mobile app, wherein rendering the mobile app includes the executable framework (1) receiving the content layout as a first-in first-out stack, which allows layouts to be nested, (2) serializing the content layout into a platform specific format, and (3) populating the user interface from the content layout to form a complete app
   and
   wherein a published mobile app is rendered by coupling the structured data file to the executable framework, wherein the mobile app is preloaded with the latest version of the structured data file available when it is published to the app store; and
   a second server having a processor and a memory for storing the published mobile app.

10. The system of claim 9, wherein the structured data files describe one or more of the following: the name of an app, the description of the app, the layout characteristics of the app, the color scheme of the app, and the like.

11. The system of claim 9, wherein the one or more modules include one or more of the following: web content, news feeds, images, audio playback, artist profiles, discography, global positioning system ("GPS")-based locations, location search, video listing and playback.

12. The system of claim 9, wherein the user selects the one or more modules by clicking on or dragging the one or more modules into a mobile app template presented on the user interface.

13. The system of claim 9, wherein the user populates content into the modules by entering content into the structured data files.

14. The system of claim 9, wherein the executable framework matches the content to the modules to render the mobile app.

15. The system of claim 14, wherein the executable framework determines if the structured data file is the most current version by comparing a timestamp of the structured data file used to create the mobile app with the timestamp of the structured data file stored on the server.

16. The system of claim 9, wherein the second server comprises an app store.

17. The system of claim 9, wherein the published mobile app includes the user provided content as viewable content.

\* \* \* \* \*